US007287804B2

(12) United States Patent
Yamagishi et al.

(10) Patent No.: US 7,287,804 B2
(45) Date of Patent: Oct. 30, 2007

(54) TENSION CONTROLLER AND OPENING-AND-CLOSING DEVICE FOR VEHICLE HAVING THE SAME

(75) Inventors: Jun Yamagishi, Yokohama (JP); Shinichiro Kita, Yokohama (JP)

(73) Assignee: Ohi Seisakusho Co., Ltd. (JP)

( * ) Notice: Subject to any disclaimer, the term of this patent is extended or adjusted under 35 U.S.C. 154(b) by 578 days.

(21) Appl. No.: 10/812,563

(22) Filed: Mar. 30, 2004

(65) Prior Publication Data

US 2004/0195419 A1 Oct. 7, 2004

(30) Foreign Application Priority Data

Mar. 31, 2003 (JP) .......................... P2003-096363
May 22, 2003 (JP) .......................... P2003-145338

(51) Int. Cl.
*B60J 5/06* (2006.01)

(52) U.S. Cl. ...................... 296/155; 296/146.4; 49/360

(58) Field of Classification Search ............ 296/146.4, 296/155, 89, 146.16; 254/225, 226; 49/280, 49/360

See application file for complete search history.

(56) References Cited

U.S. PATENT DOCUMENTS

| | | | | |
|---|---|---|---|---|
| 4,932,715 | A * | 6/1990 | Kramer | 296/155 |
| 5,809,696 | A * | 9/1998 | Watanabe | 49/360 |
| 5,833,301 | A * | 11/1998 | Watanabe et al. | 296/155 |
| 6,089,649 | A * | 7/2000 | Hamada et al. | 296/155 |
| 6,198,242 | B1 * | 3/2001 | Yokomori et al. | 318/445 |
| 6,390,535 | B1 * | 5/2002 | Chapman | 296/155 |
| 6,866,250 | B2 * | 3/2005 | Kita | 254/225 |
| 6,910,730 | B2 * | 6/2005 | Kinoshita et al. | 296/146.16 |
| 7,151,323 | B2 * | 12/2006 | Yokomori | 307/9.1 |
| 2004/0189046 | A1 * | 9/2004 | Kawanobe et al. | 296/155 |
| 2004/0256883 | A1 * | 12/2004 | Ichinose et al. | 296/155 |
| 2006/0284447 | A1 * | 12/2006 | Sato | 296/155 |

FOREIGN PATENT DOCUMENTS

| | | |
|---|---|---|
| DE | 198 37 560 A1 | 3/2000 |
| DE | 101 51 068 A1 | 4/2003 |
| JP | 11-236783 | 8/1999 |

* cited by examiner

*Primary Examiner*—Jason S Morrow
(74) *Attorney, Agent, or Firm*—Kilpatrick Stockton LLP

(57) ABSTRACT

An opening and closing device opens and closes a sliding door by using a cable connected to the sliding door movably attached to a vehicle body. The opening and closing device has a base bracket, a motor, a transmission, a rotary drum, a first conduit fixed portion, a second conduit fixed portion, a first tension controller and a second tension controller. The base bracket is fixed to the vehicle body with bolts. The motor, the transmission, the rotary drum, the first and second conduit fixed portions and the first and second tension controllers are fixed to a disposition face of the base bracket. The first and second tension controllers are respectively disposed between the rotary drum and the first conduit fixed portion and between the rotary drum and the second conduit fixed portion, and applies tension to the cable fed from the rotary drum to take up the slack.

16 Claims, 14 Drawing Sheets

TENSION CONTROLLER AND OPENING-AND-CLOSING DEVICE FOR VEHICLE HAVING THE SAME

CROSS REFERENCE TO RELATED APPLICATION

This application claims benefit of priority under 35 U.S.C. § 119 to Japanese Patent Application No. 2003-096363 filed on Mar. 31, 2003 and Japanese Patent Application No. 2003-145338 filed on May 22, 2003, the entire contents of which are incorporated by reference herein.

BACKGROUND OF THE INVENTION

1. Field of the Invention

The present invention relates to a tension controller for applying tension to a cable used to move an opened-and-closed body attached to a vehicle body and also relates to an opening and closing device for vehicle having the same.

2. Description of the Related Art

An opening and closing device for vehicle has been disclosed in Japanese Patent Provisional Publication No.9-256732. In the opening and closing device for vehicle, a cable has a central portion to be wound around a rotary drum and both end portions to be connected to a sliding door. The cable is passed through flexible conduits in the vicinity of both sides of the rotary drum and wired along a rail for guiding the sliding door. The cable is wound around the rotary drum and fed from the rotary drum at the same time to move the sliding door along the rail in the desired direction. Further, the cable is passed through two tension controllers. One tension controller is disposed between the rotary drum and one conduit, and the other tension controller is disposed between the rotary drum and the other conduit.

The tension controller applies tension to the cable fed from the rotary drum to take up the slack. The tension controller has a sliding case, a tension pulley and a compression spring. The sliding case rotatably supports the tension pulley at one end portion thereof and receives the compression spring therein. The tension pulley abuts on the cable fed from the rotary drum. The compression spring always biases the tension pulley toward the cable and applies tension to the cable to take up the slack.

Besides, another opening and closing device for vehicle has been disclosed in Japanese Patent Provisional Publication No. 2001-115736. The opening and closing device for vehicle has a cable drive unit. The cable drive unit includes a base bracket, a motor, a rotary drum and a transmission. The base bracket is fixed to a vehicle body. The motor generates driving force to rotate the rotary drum. The rotary drum has an external peripheral surface on which the central portion of a cable connected to a sliding door is wound. The transmission reduces the number of revolutions of the motor and transmits it to the rotary drum. The motor and the transmission are disposed on one side of the base bracket, and the rotary drum is disposed on the other side of the base bracket. In the above structure, the opening and closing device for vehicle allows the rotary drum to rotate in the predetermined direction by transmitting the numbers of revolutions of motor to the rotary drum via the transmission. Thereby, the cable is wound around the rotary drum and fed from the rotary drum at the same time to move the sliding door along the rail in the desired direction.

The former opening and closing device has the following problem. In the attaching operation of the cable, both end portions of the cable are connected to the sliding door after the cable is attached to the rotary drum and the tension controllers. Therefore, it is necessary to connect both end portions of the cable to the sliding door while the cable is stretched out against the biasing force of the compression spring, resulting in difficulty in the attaching operation of the cable.

The latter opening and closing device has the following problems. The motor and the transmission are disposed on one side of the base bracket, and the rotary drum is disposed on the other side of the base bracket. Therefore, the cable drive unit has a larger thickness, resulting in a smaller space within the interior of a vehicle. Because of the restriction on its structure, it is difficult to attach the same type of cable drive units on both the right and left sliding doors. Further, since there is not a tension controller in this device, the slack will occur in the cable fed from the rotary drum.

SUMMARY OF THE INVENTION

The object of the present invention is to provide a tension controller having such a structure that a cable is easily connected to an opened-and-closed body, and a small-sized opening and closing device for vehicle having the same.

In order to achieve the above object, the present invention provides a tension controller for applying tension to a cable connected to an opened-and-closed body which is movably attached to a vehicle body, comprising: an abutting member moving between a first area where the cable is abutted thereon and a second area where the cable is not abutted thereon; a spring biasing the abutting member in such a direction as to apply tension to the cable in the first area; and an engagement portion holding the abutting member against the biasing force of the spring in the second area.

According to the present invention, the cable can be easily connected to the opened-and-closed body by moving the abutting member to the second area and then holding it in the engagement portion against the biasing force of the spring when starting to connect the cable to the opened-and-closed body.

In order to achieve the above object, the present invention provides an opening and closing device for vehicle for opening and closing an opened-and-closed body by using a cable connected to the opened-and-closed body which is movably attached to a vehicle body, comprising a base bracket fixed to the vehicle body with bolts; a motor fixed to a disposition face of the base bracket; a transmission fixed to the disposition face of the base bracket and changing number of the revolutions of the motor; a rotary drum supported with a shaft in the central portion of the disposition face of the base bracket, and winding one part of the cable thereon and feeding another part of the cable therefrom at the same time by the rotation of the motor outputted from the transmission; a first conduit fixed portion fixed to a first end portion of the disposition face of the base bracket and slideably passing the cable therethrough; a second conduit fixed portion fixed to a second end portion of the disposition face of the base bracket and slidably passing the cable therethrough; a first tension controller fitted between the rotary drum and the first conduit fixed portion and applying tension to the cable fed from the rotary drum, based on the rotation in a first direction of the rotary drum; and a second tension controller fitted between the rotary drum and the second conduit fixed portion and applying tension to the cable fed from the rotary drum, based on the rotation in a second direction of the rotary drum.

According to the present invention, since all the constituent members of the opening-and-closing device for vehicle are attached onto the disposition face of the base bracket, miniaturization of the opening-and-closing device for vehicles can be realized.

In order to achieve the above object, the present invention provides an opening-and-closing device for vehicle for opening-and-closing an opened-and-closed body by using a first cable and a second cable connected to the opened-and-closed body which is movably attached to a vehicle body, comprising: a base bracket fixed to the vehicle body with bolts; a motor fixed to a disposition face of the base bracket; a transmission fixed to the disposition face of the base bracket and changing number of the revolutions of the motor; a rotary drum supported with a shaft in the central portion of the disposition face of the base bracket, and winding one of the first cable and the second cable thereon and feeding the other of the first cable and the second cable therefrom at the same time by the rotation of the motor outputted from the transmission; a first conduit fixed portion fixed to a first end portion of the disposition face of the base bracket and slideably passing the first cable therethrough; a second conduit fixed portion fixed to a second end portion of the disposition face of the base bracket and slidably passing the second cable therethrough; a first tension controller fitted between the rotary drum and the first conduit fixed portion and applying tension to the first cable fed from the rotary drum, based on the rotation in a first direction of the rotary drum; and a second tension controller fitted between the rotary drum and the second conduit fixed portion and applying tension to the second cable fed from the rotary drum, based on the rotation in a second direction of the rotary drum.

According to the present invention, since all the constituent members of the opening-and-closing device for vehicle are attached onto the disposition face of the base bracket, miniaturization of the opening-and-closing device for vehicles can be realized. Further, since a cable assembly is composed of the first cable and the second cable each to be connected to the rotary drum at one end thereof, the cable assembly can be fine-adjusted in the total length thereof.

DESCRIPTION OF THE PREFERRED EMBODIMENT

Referring to FIGS. 1 to 16, an embodiment of the present invention will be described. The longitudinal, lateral and vertical directions of a vehicle are defined as X, Y and Z axes, respectively. The X, Y and Z axes are perpendicular to one another.

Figure 1:
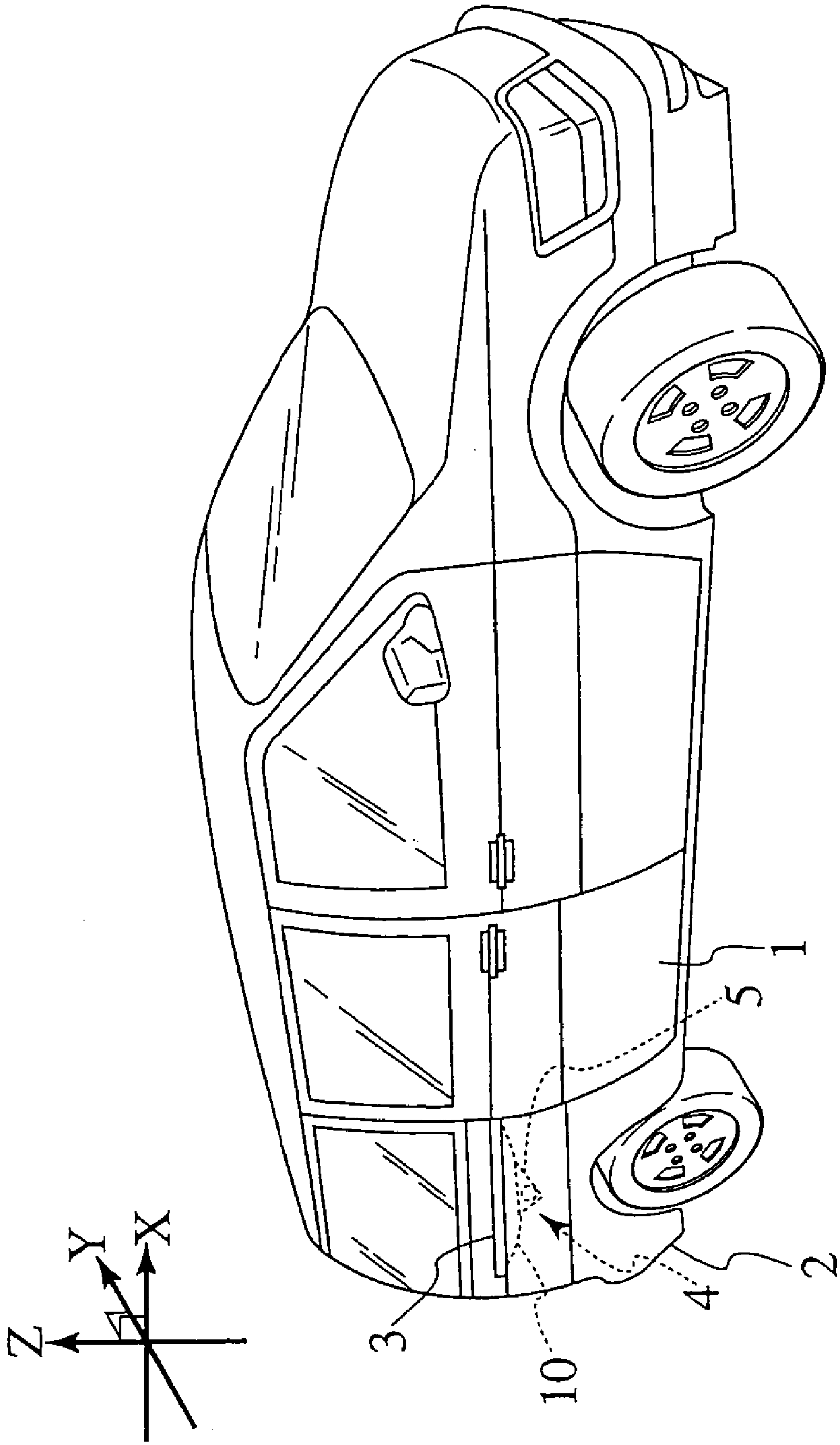
FIG. 1 is a perspective view of a vehicle on which an opening-and-closing device for vehicle according to the present invention is mounted.

As shown in FIG. 1, a sliding door (an opened-and-closed body) 1 is movably attached to a body panel 2 along the longitudinal direction (X axis). The sliding door 1 is movably supported on an upper rail (not shown in the figure), a lower rail (not shown) and a guide rail 3 which are disposed on an upper end of a door-opening portion, a lower end of the door-opening portion and an external side plate (−Y side) of the body panel 2, respectively. The sliding door 1 is moved by an opening-and-closing device 4 between an entirely closed position (FIG. 1) and an entirely opened position (not shown) along the upper rail, the lower rail and the guide rail 3. The body panel 2 firstly extends toward the exterior (−Y direction) of the vehicle and then extends toward the rear (−X direction) of the vehicle along the longitudinal direction of the vehicle (see FIG. 3).

Figure 2:
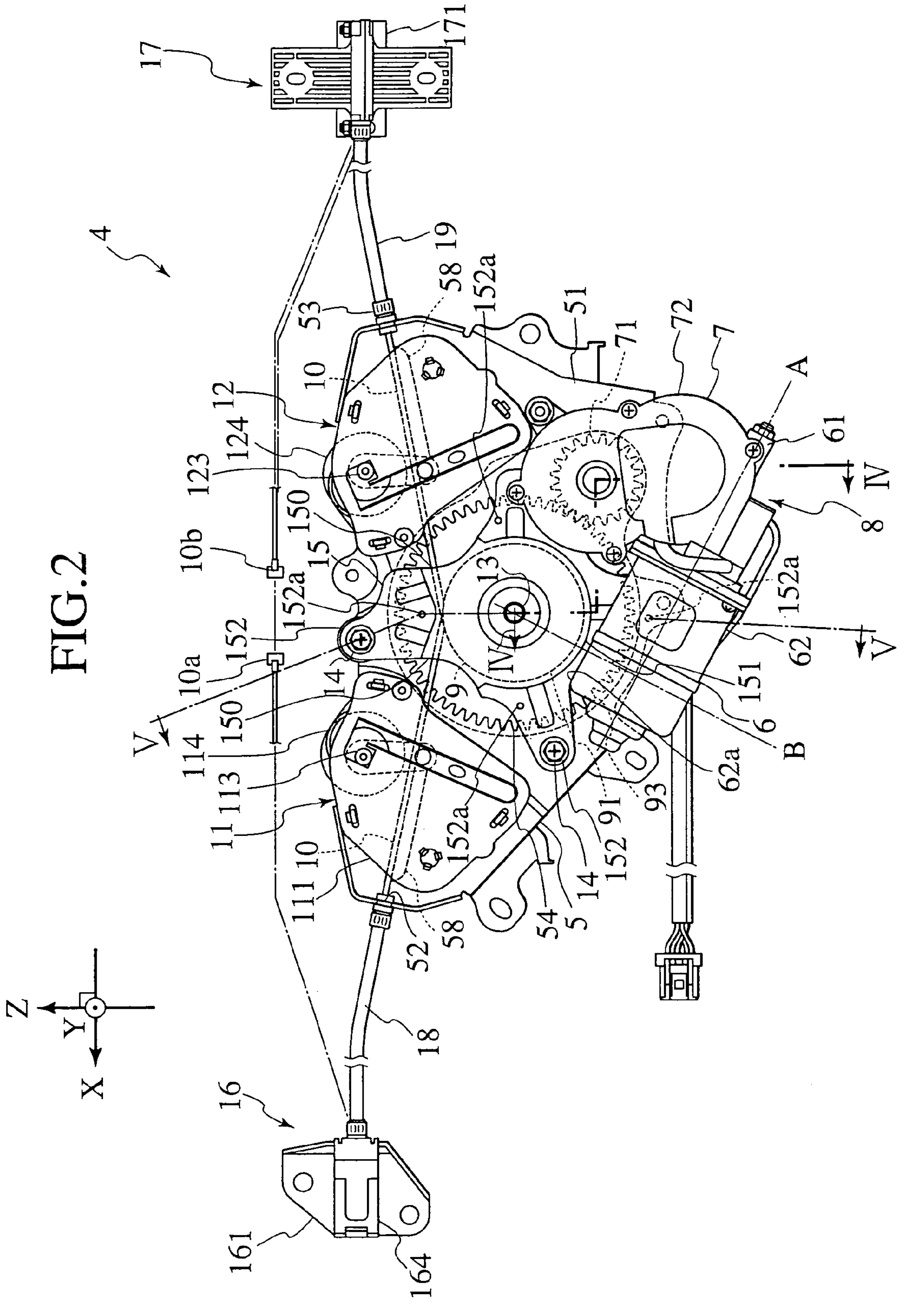
FIG. 2 is a front view of an opening-and-closing device for vehicle according to the present invention.

As shown in FIG. 2, the opening-and-closing device 4 includes a cable drive unit 8, a cable 10, a first cable guide member 16 and a second cable guide member 17. The cable drive unit 8 is disposed on an internal side plate (+Y side) of the body panel 2. The cable 10 has a central portion to be wound around a rotary drum 9 (one member of the cable drive unit 8) and both end portions to be connected to the sliding door 1. The first cable guide member 16 is disposed in the vicinity of a front end portion (+X side) of the guide rail 3 of the body panel 2. The first cable guide member 16 changes the extending direction of the cable 10 toward the rear of the vehicle. The second cable guide member 17 is disposed in the vicinity of a rear end portion (−X side) of the guide rail 3 of the body panel 2. The second cable guide member 17 changes the extending direction of the cable 10 toward the front of the vehicle.

The cable drive unit 8 includes a base bracket 5, a motor 6, a transmission 7, the rotary drum 9, a first tension controller 11, a second tension controller 12, a first conduit fixed portion 52 and a second conduit fixed portion 53. The base bracket 5 is a metal plate and is fixed to the internal side plate of the body panel 2 with bolts (not shown). On a disposition face 51 (+Y side) of the base bracket 5 disposed are the motor 6, the transmission 7, the rotary drum 9, the first tension controller 11, the second tension controller 12, the first conduit fixed portion 52 and the second conduit fixed portion 53. The motor 6 generates driving force to rotate the rotary drum 9. The transmission 7 reduces the number of revolutions of the motor and transmits it to the rotary drum 9. The rotary drum 9 is made of a synthesized resin. The central portion of the cable 10 connected to the sliding door 1 is wound on the rotary drum 9. The first tension controller 11 applies tension to the cable 10 fed from the rotary drum 9 toward the front of the vehicle. The second tension controller 12 applies tension to the cable 10 fed from the rotary drum 9 toward the rear of the vehicle. The slack of the cable 10 is taken up by the first tension controller 11 and the second tension controller 12. Besides, although an internal side plate (+Y side) of the base bracket 5 is selected as the disposition face 51 in the present embodiment, an external side plate (−Y side) may also be employed as the disposition face 51.

Disposing the above members on the disposition face 51 of the base bracket 5 allows the cable drive unit 8 to have a small size and a reduced thickness. Since the thickness of the cable drive unit 8 is reduced, the restriction on its structure is relaxed and it is possible to attach the same type of cable drive units 8 onto both the right and left sliding doors.

Figure 4:
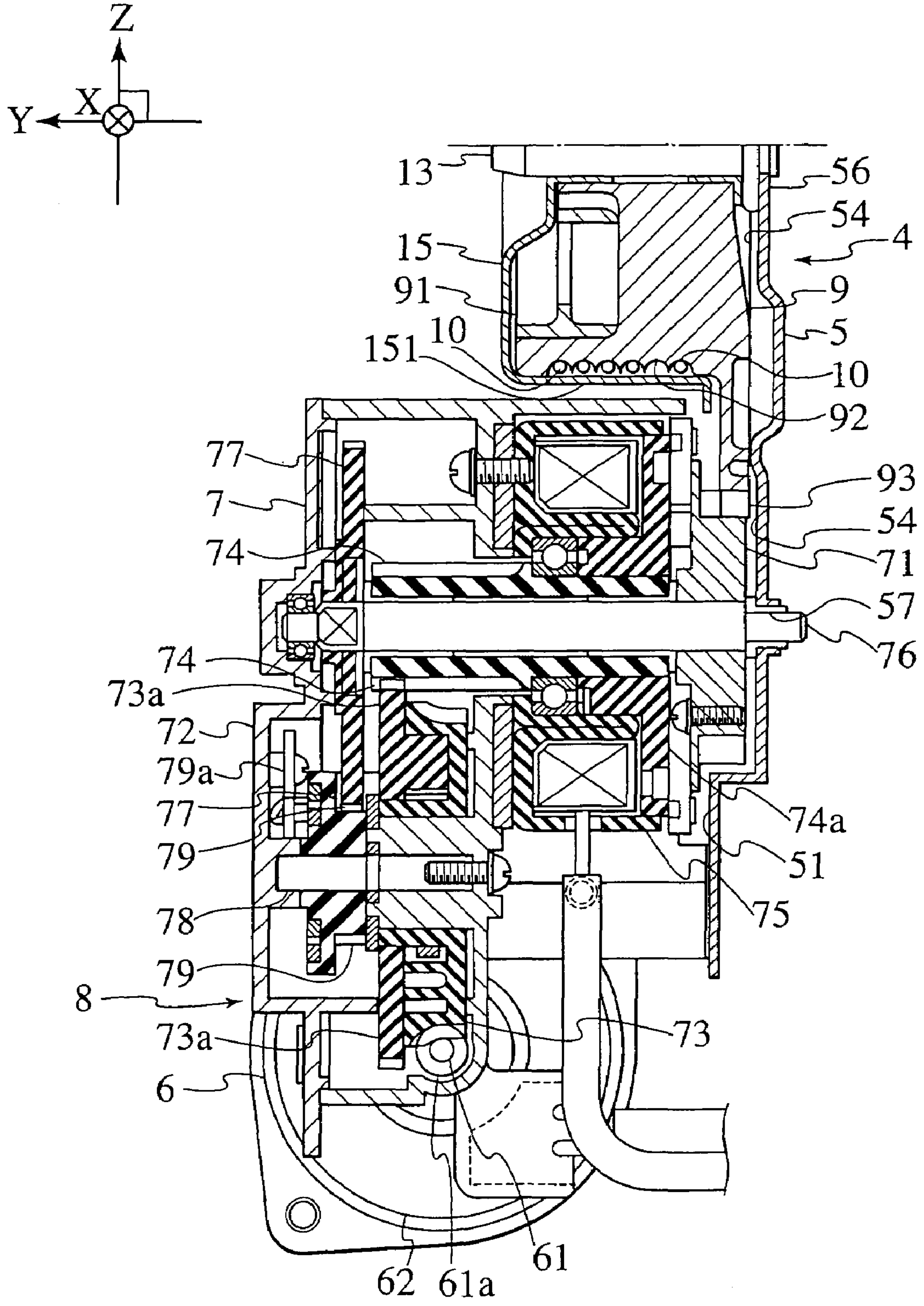
FIG. 4 is an enlarged cross-sectional view along the IV-IV line in FIG. 2.
Figure 5:
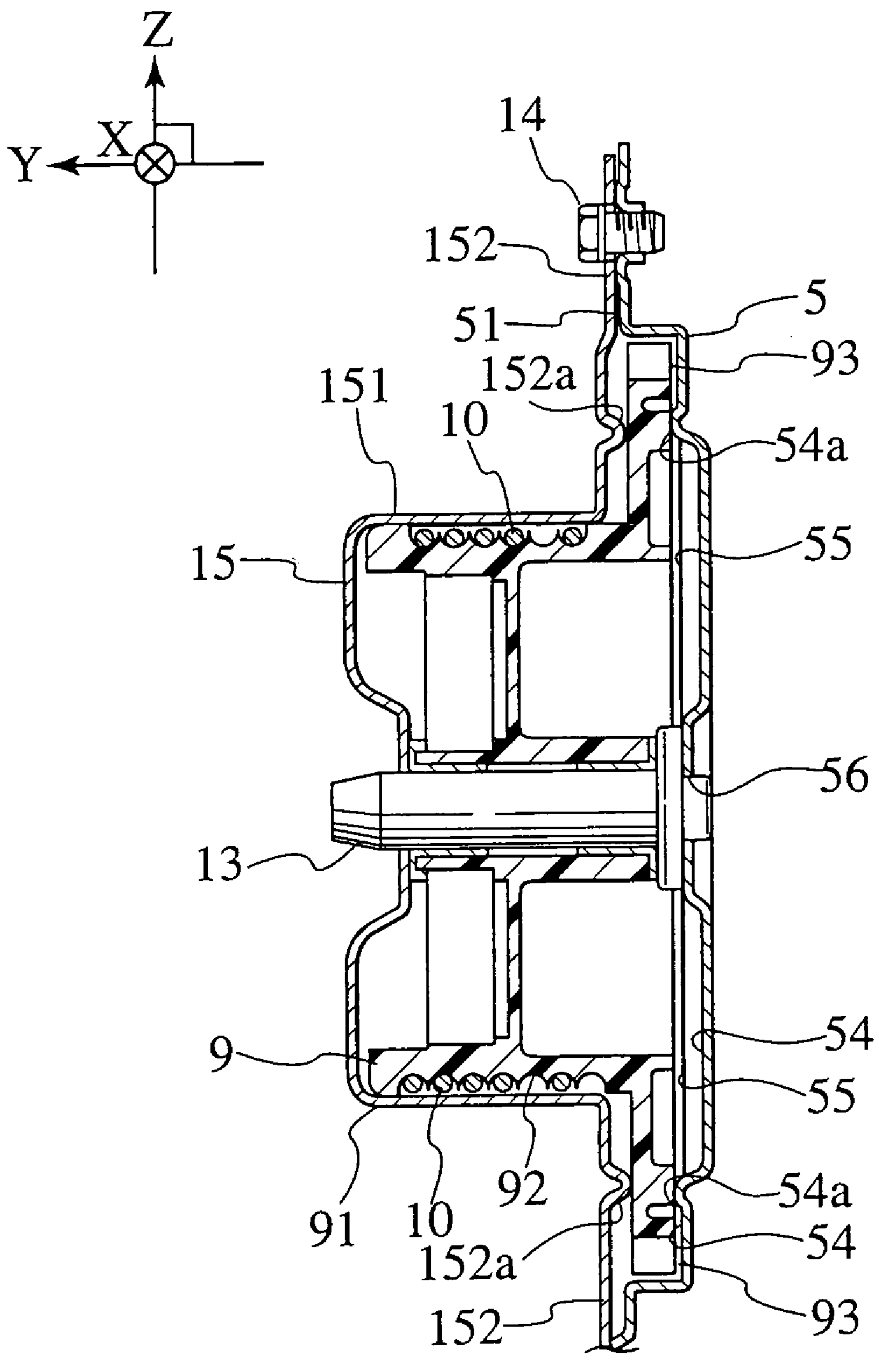
FIG. 5 is an enlarged cross-sectional view along the V-V line in FIG. 2.

The rotary drum 9 has a drum portion 91 and a gear portion 93, and is supported with a shaft 13 between the base bracket 5 and a drum cover 15 (see FIGS. 4 and 5). The shaft 13 is implanted in the central portion of the base bracket 5 and extends from the disposition face 51 toward the interior (+Y side) of the vehicle. The drum cover 15 is fixed to the base bracket 5 to protect the rotary drum 9. The drum portion 91 is formed in the shape of a cylinder. On an external peripheral face of the drum portion 91 cut is a spiral winding groove 92 along which the cable 10 is wound. The gear portion 93 is integrally formed on one face (−Y side) opposed to the disposition face 51. The outer diameter of the gear portion 93 is larger than that of the drum portion 91. The gear portion 93 is engaged with one of the gears of the transmission 7.

The drum cover 15 has opening portions 150, 150, a cover portion 151 and attachment portions 152. The opening portions 150, 150 introduce the cable 10 into a space formed between the drum cover 15 and the drum portion 91. The cover portion 151 covers the external peripheral face, except it opposed to the opening portions 150, 150, of the drum portion 91, and all the interior face (+Y side) of the drum portion 91. The attachment portions 152 are configured to extend from the cover portion 151 so as to be parallel to the disposition face 51. The drum portion 91 is received between the base bracket 5 and the cover portion 151, and several parts of the gear portion 93 are received between the base bracket 5 and attachment portions 152 by fixing the attachment portions 152 to the disposition face 51 with bolts 14. Since the cover portion 151 of the drum cover 15 covers the external peripheral face of the drum portion 91, the cable 10 can be prevented from slipping on the winding groove 92. Therefore, the cable 10 is securely wound around the rotary drum 9.

The motor 6 has an output shaft 61 and a motor casing 62, and is disposed below (−Z side) the rotary drum 9. The output shaft 61 is configured to extend outward from an end portion (−X side) of the motor casing 62. The output shaft 61 is provided with an armature. An axis A of the motor casing 62 coincides with that of the output shaft 61. One side 62*a* (+Z side) of the motor casing 62 is disposed in the vicinity of the drum portion 91 of the rotary drum 9. Since the line B joining the shaft 13 of the rotary drum 9 and the axis A of the motor casing 62 is perpendicular to the axis A of the motor casing 62, the width of the cable drive unit 8 is reduced. Consequently, since the restriction on its structure is relaxed, the small sized cable drive unit 8 is achieved, and the same type of cable drive units 8 can be attached onto both the right and left sliding doors.

As shown in FIGS. 2 and 4, the transmission 7 has an output gear 71, a gear box 72, a worm wheel 73, an idle gear 74, an electromagnetic clutch 75, shafts 76, 78, a large diameter gear 77, a small diameter gear 79 and a rotary encoder 79*a*. The transmission 7 is disposed below (−Z side) of the rotary drum 9 and also at the back (−X side) of the motor 6. The gear box 72 is fixed onto the disposition face 51 of the base bracket 5. As shown in FIG. 4, the gear box 72 receives the worm wheel 73, the idle gear 74, the electromagnetic clutch 75, the shafts 76, 78, the large diameter gear 77, the small diameter gear 79 and the rotary encoder 79*a* therein. The worm wheel 73 is engaged with a worm gear 61*a* fixed to the output shaft 61 of the motor 6. The idle gear 74 is engaged with a gear portion 73*a* of the worm wheel 73. The electromagnetic clutch 75 is provided around the idle gear 74.

The output gear 71 is disposed so as to be opposed to the disposition face 51 and is exposed from the gear box 72. Once the electromagnetic clutch 75 is excited, the output gear 71 is attracted onto an attracted face 74*a* of the idle gear 74 to rotate integrally with the idle gear 74. According to the above structure, the transmission 7 reduces the number of revolutions of the motor 6 and transmits it to the rotary drum 9 via the gear portion 93 of the rotary drum 9.

The shaft 76 has one end rotatably fixed to the disposition face 51 of the base bracket 5 and the other end rotatably fixed to an inner surface on the interior side (+Y side) of the gear box 72. The idle gear 74 is rotatably supported with the shaft 76 within the gear box 72. The output gear 71 is fixed onto one end (−Y side) of the shaft 76 and rotates integrally with the shaft 76. The large diameter gear 77 is fixed onto the other end (+Y side) of the shaft 76 and rotates integrally with the shaft 76.

The shaft 78 has one end fixed to an inner surface on the exterior side (−Y side) of the gear box 72 and the other end fixed to an inner surface on the interior side of the gear box 72. The worm wheel 73 and the small diameter gear 79 are rotatably supported with the shaft 78 within the gear box 72. The large diameter gear 77 is engaged with the small diameter gear 79 and increases the number of revolutions of the output gear 71 and transmits it to the small diameter gear 79.

The rotary encoder 79*a* is disposed on an inner surface on the interior side of the gear box 72 and also positioned in the vicinity of the small diameter gear 79. The rotary encoder 79*a* detects the number of revolutions of the small diameter gear 79 and outputs a pulse signal (a detection signal) onto a control system (not shown). The control system detects an opened-and-closed position and a moving direction of the sliding door 1 on the basis of the detection signal.

Figure 6:
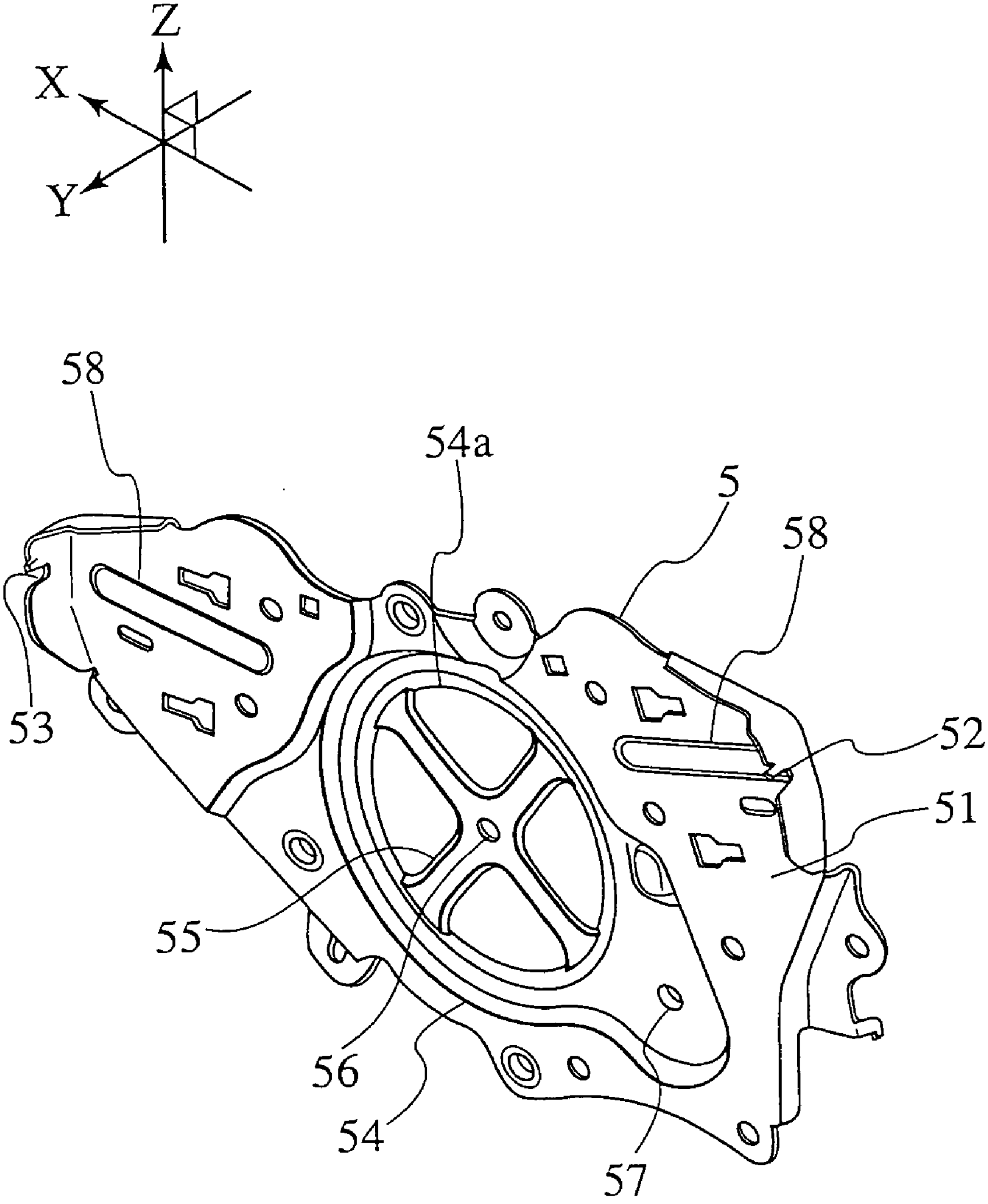
FIG. 6 is a partly perspective view of a base bracket according to the present invention.

As shown in FIGS. 4 to 6, a first recess 54 is formed in a region of the disposition face 51 of the base bracket 5 which is opposed to the gear portion 93 of the rotary drum 9 and the output gear 71 of the transmission 7. The first recess 54 is concave toward the exterior of the vehicle, and has a first region for receiving a part of the gear portion 93 therein and a second region for receiving a part of the output gear 71 therein. As shown in FIG. 6, a reinforcement beam 55 is positioned on the first region. The reinforcement beam 55 is formed in the shape of a cross and protrudes toward the interior of the vehicle. In the central portion of the reinforcement beam 55, formed is a shaft hole 56 into which the shaft 13 of the rotary drum 9 is fitted. In the central portion of the second region, formed is a shaft hole 57 into which the shaft 76 is rotatably fitted. Since the first recess 54 increases rigidity of the base bracket 5, difference in gear pitches occurring between the gear portion 93 and the output gear 71 can be reduced without increasing the thickness of the bracket 5. Moreover, since the reinforcement beam 55 increases in rigidity of the first recess 54, the rigidity of the base bracket 5 is enhanced further.

As shown in FIG. 5, a first projection portion 152*a* is formed on the attachment portions 152 of the drum cover 15, which are opposed to the gear portion 93 of the rotary drum 9. Besides, a second projection portion 54*a* is formed in the first recess 54 opposed to the gear portion 93 of the rotary drum 9. When the gear portion 93 becomes rickety along the axial direction (Y-axis) of the shaft 13, the gear portion 93 abuts on the first projection portion 152*a* and the second projection portion 54*a*. Therefore, the first projection portion 152*a* and the second projection portion 54*a* restrains the chattering of the gear portion 93 and allows the gear portion 93 to be securely engaged with the output gear 71. Consequently, the chattering of the rotary drum 9 is restrained and the cable 10 is securely wound around the drum portion 91 of the rotary drum 9. Further, although the projection portions are formed to both the attachment portions 152 and the first recess 54, the projection portion may be formed to either the attachment portions 152 or the first recess 54.

As shown in FIG. 2, the first conduit fixed portion 52 is disposed at the front end portion (+X side) of the base bracket 5. The second conduit fixed portion 53 is disposed at the rear end portion (−X side) of the base bracket 5. Since the rotary drum 9 is supported with the shaft 13 at the center portion of the base bracket 5, the first conduit fixed portion 52 and the second conduit fixed portion 53 are respectively positioned in the equal distance from the rotary drum 9 in the front and rear sides of the vehicle. Therefore, it is possible to use the same type of cable drive units 8 for both the right and left sliding doors.

The first tension controller 11 is fixed to the base bracket 5 by sliding it in the front (+X direction) of the vehicle. The first tension controller 11 is disposed between the rotary drum 9 and the first conduit fixed portion 52 on the disposition face 51 of the base bracket 5. Also, the second tension controller 12 is fixed to the base bracket 5 by sliding it in the rear (−X direction) of the vehicle. The second tension controller 12 is disposed between the rotary drum 9 and the second conduit fixed portion 53 on the disposition face 51 of the base bracket 5.

Since the rotary drum 9 is supported with the shaft 13 at the center portion of the base bracket 5, the first tension controller 11 and the second tension controller 12 are positioned in the equal distance from the rotary drum 9 in the front and rear sides of the vehicle, respectively. Therefore, the slack of the cable 10 can be securely taken up and the same type of cable drive units 8 can be used for both the right and left sliding doors. That is, the same type of cable drive units 8 can be used for both the right and left sliding doors by disposing the first conduit fixed portion 52 and the second conduit fixed portion 53, and the first tension controller 11 and the second tension controller 12 have each other in the longitudinally symmetrical relationship with respect to the rotary drum 9 on the disposition face 51 of the base bracket 5.

Figure 7:
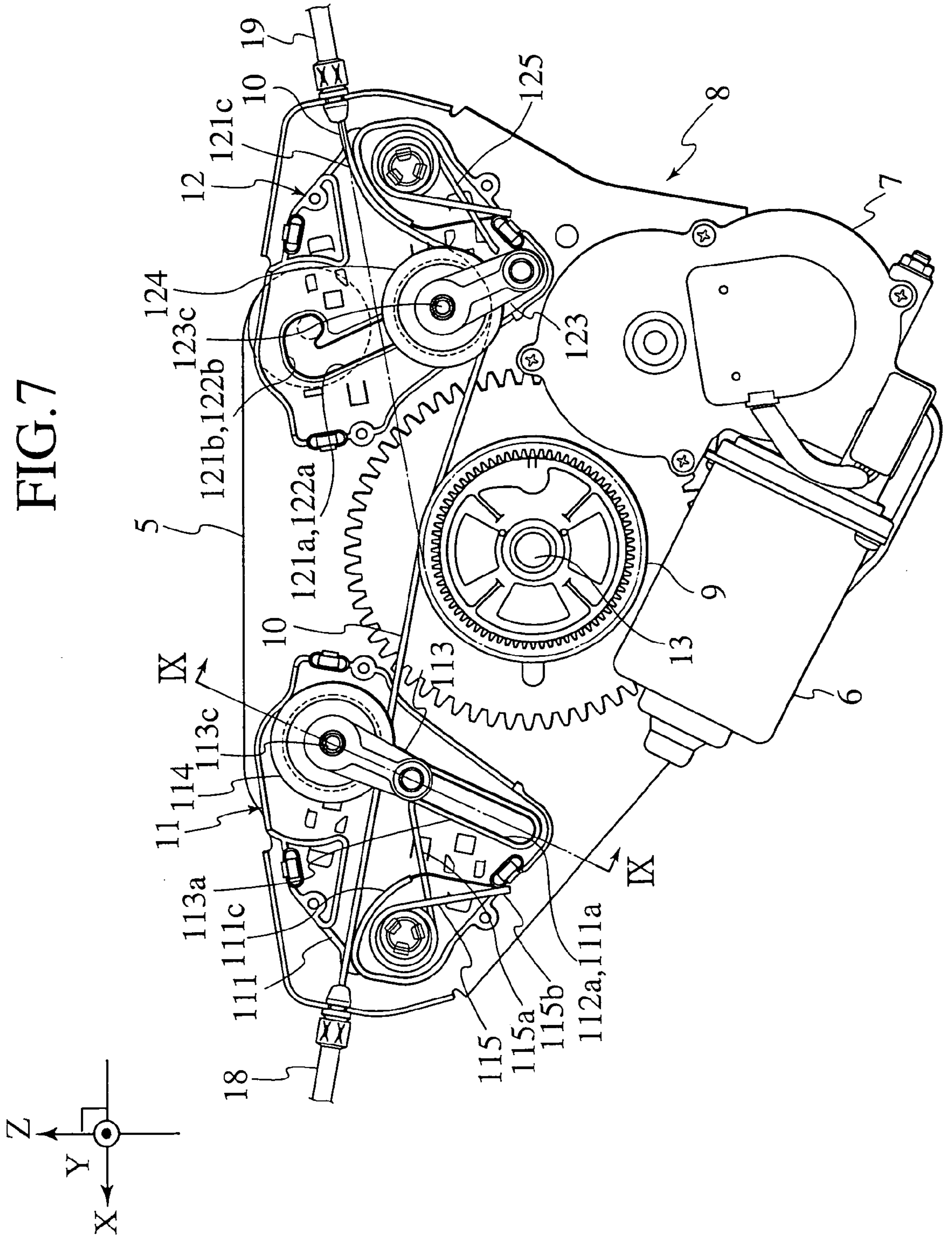
FIG. 7 is an enlarged partial front view of the opening-and-closing device for vehicle according to the present invention.
Figure 8:
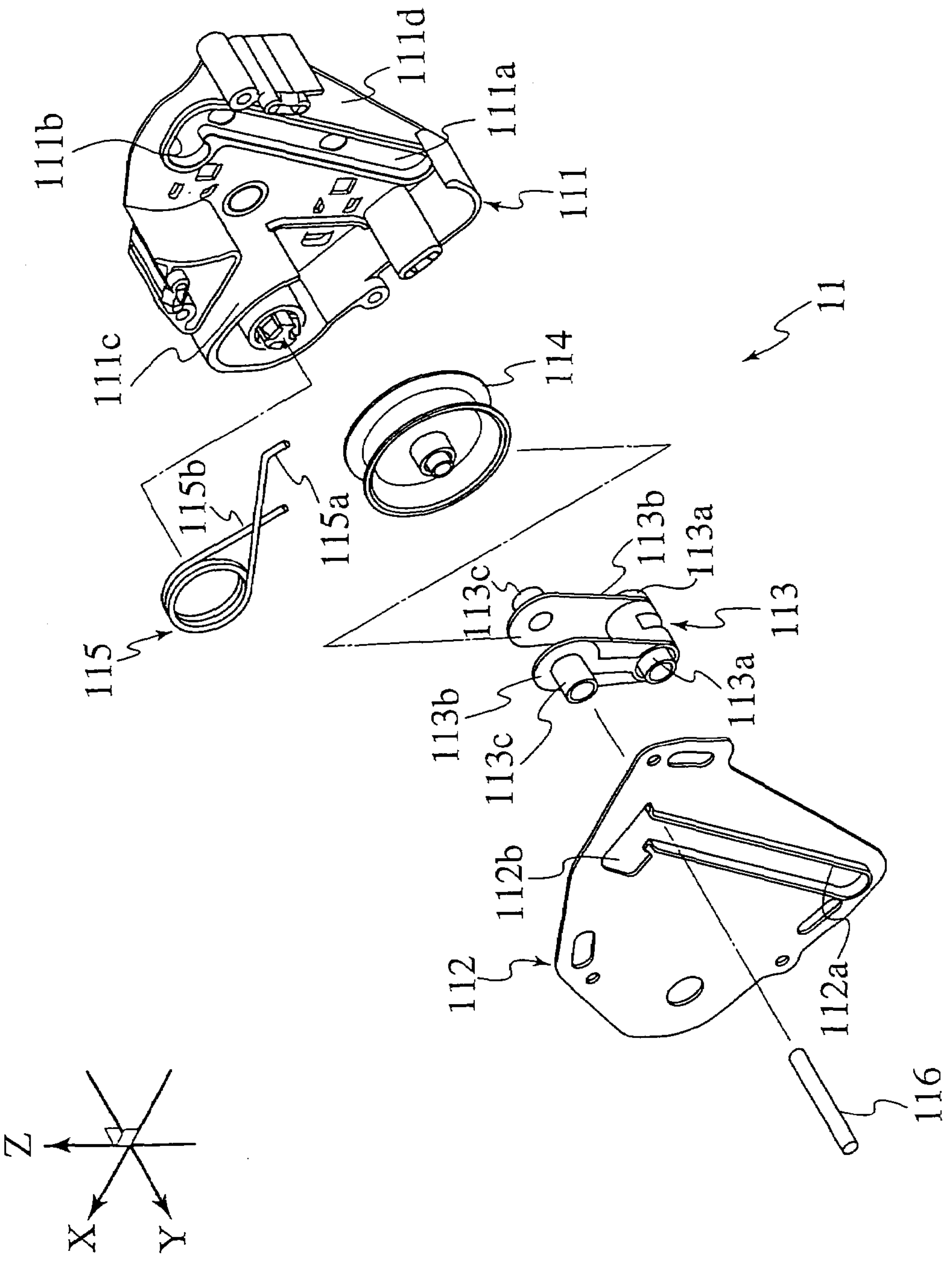
FIG. 8 is an exploded perspective view of a tension controller according to the present invention.
Figure 9:
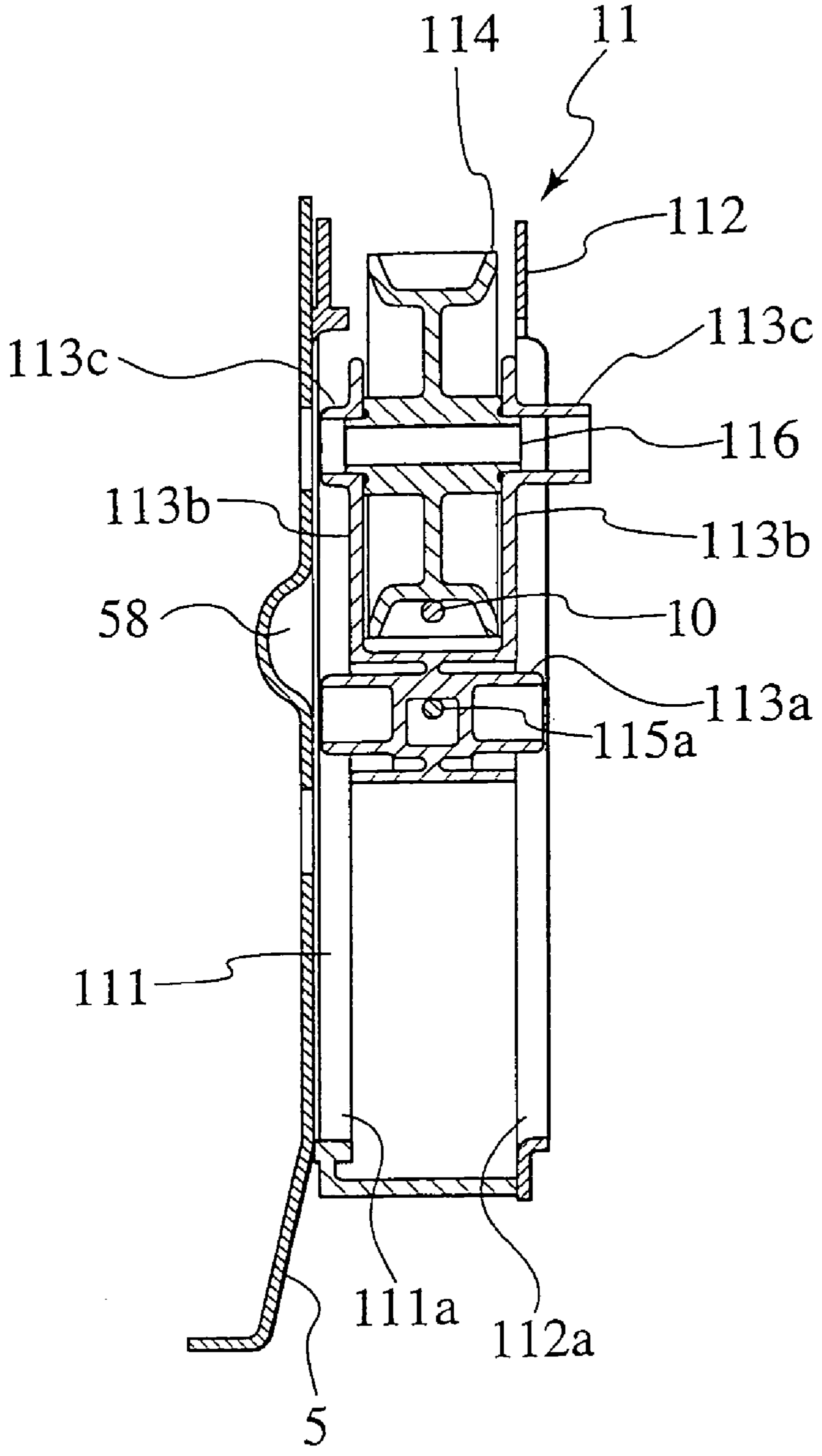
FIG. 9 is an enlarged cross-sectional view along the IX-IX line in FIG. 7.

As shown in FIGS. 7 to 9, the first tension controller 11 includes a casing 111, a cover 112, an arm 113, a pulley 114, a spring 115 and a shaft 116. Additionally, the drum cover 15 of the rotary drum 9 is omitted in FIG. 7. The casing 111 is disposed so as to be opposed to the disposition face 51. The casing 111 has a guide groove 111*a* and an engagement groove 111*b*. The guide groove 111*a* and the engagement groove 111*b* are concave toward the exterior (−Y side) of the vehicle. The guide groove 111*a* is formed in the rear end (−X side) of the casing 111 and extends in the direction intersecting the moving direction of the cable 10 (the substantial vertical direction of the vehicle). The engagement groove 111*b* is integrally communicated with the upper end portion (+Z side) of the guide groove 111*a* and extends in the substantial moving direction of the cable 10.

The cover 112 is provided on the interior side (+Y side) of the casing 111 and covers the opening of the casing 111. The cover 112 has a guide hole 112*a* and an engagement hole 112*b*. The guide hole 112*a* is formed on one face of the cover 112 which is opposed to the guide groove 111*a* of the casing 111. The engagement hole 112*b* is integrally communicated with the upper end portion (+Z side) of the guide hole 112*a* and is formed on one face of the cover 112, which is opposed to the engagement groove 111*b* of the casing 111.

Additionally, the guide groove 111*a* and the guide hole 112*a* are formed in a tension area (a first area) where tension is applied to the cable 10. Further, the engagement groove 111*b* and the engagement hole 112*b* are formed in a non-tension area (a second area) where tension is not applied to the cable 10. In the present embodiment, a guide portion has the guide groove 111*a* and the guide hole 112*a*, and an engagement portion has the engagement groove 111*b* and the engagement hole 112*b*.

Between the casing 111 and the cover 112 disposed are the arm 113, the pulley 114, and the spring 115. The arm 113 is substantially U-shaped in the cross section and has axial portions 113*a*, 113*a*, side segments 113*b*, 113*b*, and guide projections 113*c*, 113*c*. The side segments 113*b*, 113*b* being spaced-apart by a given distance and extends in the substantial vertical direction (Z-axis) of the vehicle. The side segments 113*b*, 113*b* are connected to each other at basal end portions (−Z side) thereof. The axial portions 113*a*, 113*a* are configured to extend on the interior side (+Y side) and on the exterior side (−Y side) of the vehicle respectively, and are slidably and rotatably fitted into the guide hole 112*a* and the guide groove 111*a* respectively. The guide projections 113*c*, 113*c* are configured to extend on the interior side and on the exterior side of the vehicle from free end portions of the side segments 113*b*, 113*b* respectively; and are slidably and rotatably fitted into the guide hole 112*a* and the guide groove 111*a* or into the engagement hole 112*b* and the engagement groove 111*b* respectively.

The pulley 114 is supported to the upper end portion of the arm 113 with the shaft 116 inserted into the guide projections 113*c*, 113*c* and follows movement of the arm 113. The spring 115 has a first end portion 115*a* hooked on the basal end portion of the arm 113 and a second end portion 115*b* hooked on the casing 111. According to the above structure, the spring 115 biases the pulley 114 via the arm 113 in such a direction (−Z direction) as to abut on the cable 10. In the present embodiment, an abutting member has the arm 113 and the pulley 114.

The casing 111 further has a cable guide portion 111*c* and an opening portion 111*d*. The cable guide portion 111*c* is formed on the front end side (+X side) of the casing 111, and more specifically, formed in the vicinity (+X side) of the pulley 114 which moves along the guide groove 111*a* and the guide hole 112*a*. The cable guide portion 111*c* is gradually curved so as to protrude upward (+Z direction). The cable 10 is smoothly fed toward the exterior of the first tension controller 11 through sliding on the curved surface of the cable guide portion 111*c*.

The opening portion 111*d* is formed on the rear end side of the casing 111 and widely open along the substantial vertical direction of the vehicle. Thereby, even though the cable 10 moves up and down by biasing force of the spring 115 due to the slack thereof, the casing 111 does not interfere with movement of the cable 10.

As shown in FIG. 7, when the first tension controller 11 is in operation, the pulley 114 abuts the cable 10 from the +Z side by biasing force of the spring 115 through fitting the guide projections 113*c*, 113*c* into the guide groove 111*a* and the guide hole 112*a*. Then, the pulley 114 moves in the tension area where tension is applied to the cable 10. When starting to attach the cable 10 to the sliding door 1, as shown in FIG. 2, the pulley 114 is held in the non tension area where tension is not applied to the cable 10 through fitting the guide projections 113*c*, 113*c* into the engagement groove 111*b* and the engagement hole 112*b*. Additionally, since the structure of the second tension controller 12 is the same as that of the first tension controller 11 reversed symmetrically, the explanation of the second tension controller 12 is omitted.

As shown in FIGS. 2 and 6, second recesses 58, 58 are formed in two regions of the disposition face 51 of the base bracket 5 which is opposed to the first tension controller 11 and the second tension controller 12. The second recesses 58, 58 are concave toward the exterior of the vehicle, and extend along the substantial moving direction of the cable 10. Since the second recesses 58, 58 increase rigidity of the base bracket 5, distortion of the base bracket 5, due to the fact that the rotary drum 9 winds the cable 10 thereon, can be reduced without increasing the thickness of the bracket 5. Therefore, the sliding door 1 can be surely moved by winding the cable 10 around the rotary drum 9.

Next, referring to FIG. 7, operation of the first tension controller 11 will be described when the slide door 1 is closed. The cable 10 on the −X side is fed from the rotary drum 9 and at the same time the cable 10 on the +X side is wound around the rotary drum 9 by rotating the rotary drum 9 in a clockwise direction with the motor 6. In the above situation, since the slack of the cable 10 on the −X side occurs, a pulley 124 presses the cable 10 on the −X side downward with biasing force of a spring 125 in the second tension controller 12. Thereby, the cable 10 on the −X side is provided with tension and the slack is taken up. Further, since the cable 10 on the −X side is guided along the curved surface of the cable guide portion 121*c* and then come out of the second tension controller 12, the second tension controller 12 surely takes up the slack of the cable 10. Still further, since the curved surface of the cable guide portion 121*c* on which the cable 10 on the −X side contacts slidably is formed in the shape of an arc, the cable 10 on the −X side is smoothly fed.

On the other hand, since there occurs no slack of the cable 10 on the +X side in the above situation, the pulley 114 is positioned at the upper end portion (+Z side) of the casing 111 resisting against the biasing force of the spring 115. Additionally, since the slack of the cable 10 on the +X side occurs when the rotary drum 9 is rotated in a counterclockwise direction, the first tension controller 11 takes up the slack of the cable 10.

Below described will be a procedure for connecting the both end portions of the cable 10 to the sliding door 1.

In the first tension controller 11, the guide projections 113*c*, 113*c* are respectively engaged with the engagement groove 111*b* and the engagement hole 112*b* by moving the arm 113 and the pulley 114 to the upper portions of the guide groove 111*a* and the guide hole 112*a* resisting against the biasing force of the spring 115. Thereby, the pulley 114 is temporarily held in the non tension area where the cable 10 is not provided with any tension (refer to FIGS. 2 and 7). Similarly, In the second tension controller 12, guide projections 123*c*, 123*c* are respectively engaged with an engagement groove 121*b* and an engagement hole 122*b* by moving an arm 123 and the pulley 124 to the upper portions of a guide groove 121*a* and a guide hole 122*a* resisting against the biasing force of the spring 125. Thereby, the pulley 124 is temporarily held in the non tension area where the cable 10 is not provided with any tension (refer to FIGS. 2 and 7).

After temporarily holding the pulleys 114, 124 in the non tension area, cable ends 10*a*, 10*b* are connected to the sliding door 1. And then, in the first tension controller 11, the guide projections 113*c*, 113*c* are moved from the engagement groove 111*b* and the engagement hole 112*b* to the guide groove 111*a* and the guide hole 112*a* respectively. Thereby, the pulley 114 is easily moved to a lower portion (−Z side) of the tension area to abut on the cable 10 via the arm 113 by the biasing force of the spring 115. Similarly, in the second tension controller 12, the guide projections 123*c*, 123*c* are moved from the engagement groove 121*b* and the engagement hole 122*b* to the guide groove 121*a* and the guide hole 122*a* respectively. Thereby, the pulley 124 is easily moved to a lower portion (−Z side) of the tension area to abut on the cable 10 via the arm 123 by the biasing force of the spring 125.

In the first tension controller 11 and the second tension controller 12, the arms 113, 123 and the pulleys 114, 124 are temporarily held easily and securely in the non-tension area. Therefore, since the first tension controller 11 and the second tension controller 12 never applies any tension to the cable 10 when starting to connect both end portions of the cable 10 to the sliding door 1, the efficiency of the attaching operation of the cable is enhanced. Further in the first tension controller 11 and the second tension controller 12, since the arms 113, 123 and the pulleys 114, 124 are easily released from the temporarily held state, the attaching operation of the cable 10 can be completed more rapidly.

Figure 10:
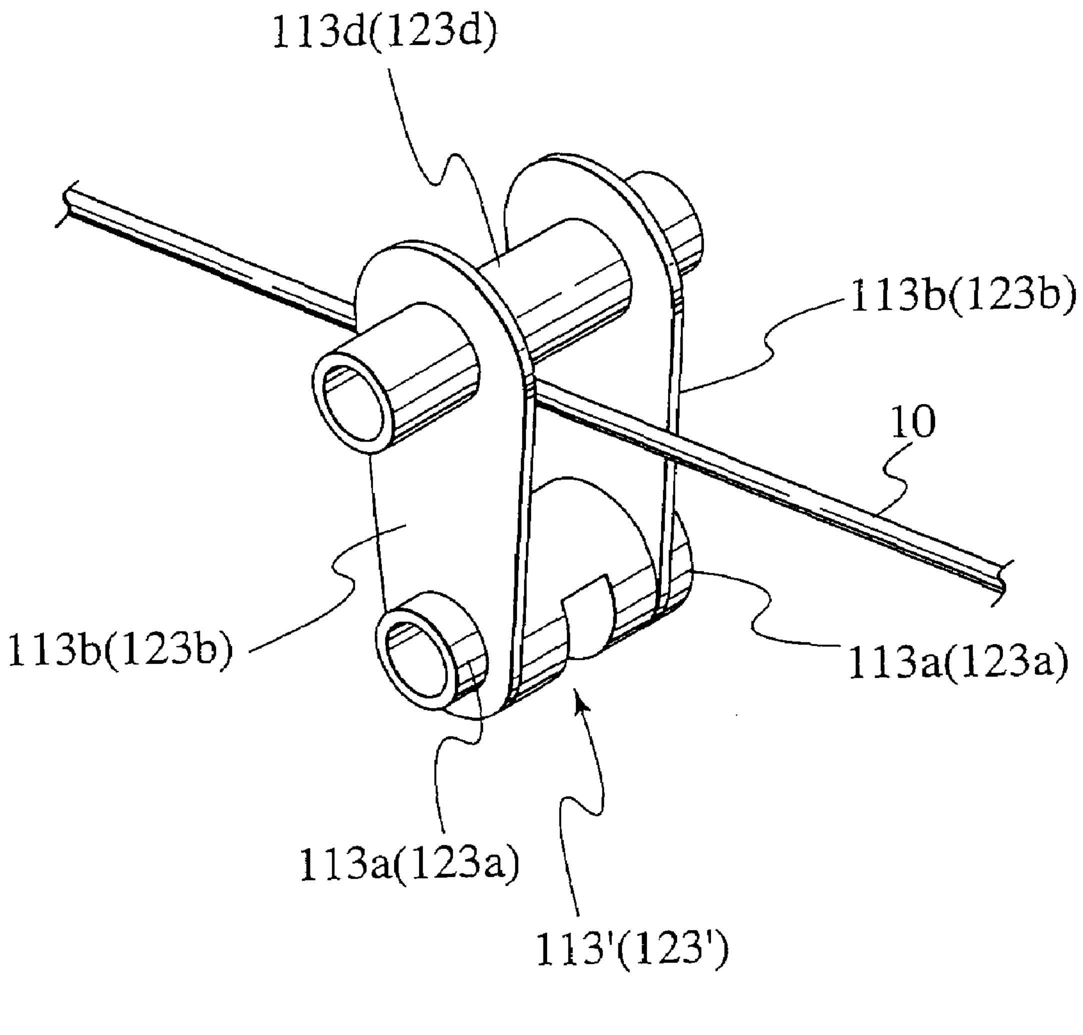
FIG. 10 is an exploded perspective view of a modified arm according to the present invention.

Besides, although the first tension controller 11 and the second tension controller 12 are employed in the opening-and-closing device for opening-and-closing the sliding door 1 in the present embodiment, without limiting that, they can be employed in other opening-and-closing devices such as a window regulator for opening-and-closing windows. Moreover, although the pulleys 114, 124 are attached to the arms 113, 123 in the present embodiment, without limiting that, free end portions 113*d*, 123*d* attached to the arms 113', 123' may be abutted on the cable 10 as shown in FIG. 10.

A first conduit 18 is a flexible conduit and has a front end portion (+X side) fixed to the first cable guide member 16 and a rear end portion (−X side) fixed to the first conduit fixed portion 52 which is disposed in a front end portion (+X side) of the base bracket 5. The cable 10 fed from the rotary drum 9 toward in the front (+X side) of the vehicle is slidably passed through the first conduit 18.

A second conduit 19 is a flexible conduit and has a front end portion (+X side) fixed to the second conduit fixed portion 53 and a rear end portion (−X side) fixed to the second cable guide member 17. The cable 10 fed from the rotary drum 9 toward in the rear (−X side) of the vehicle is slidably passed through the second conduit 19.

Figure 3:
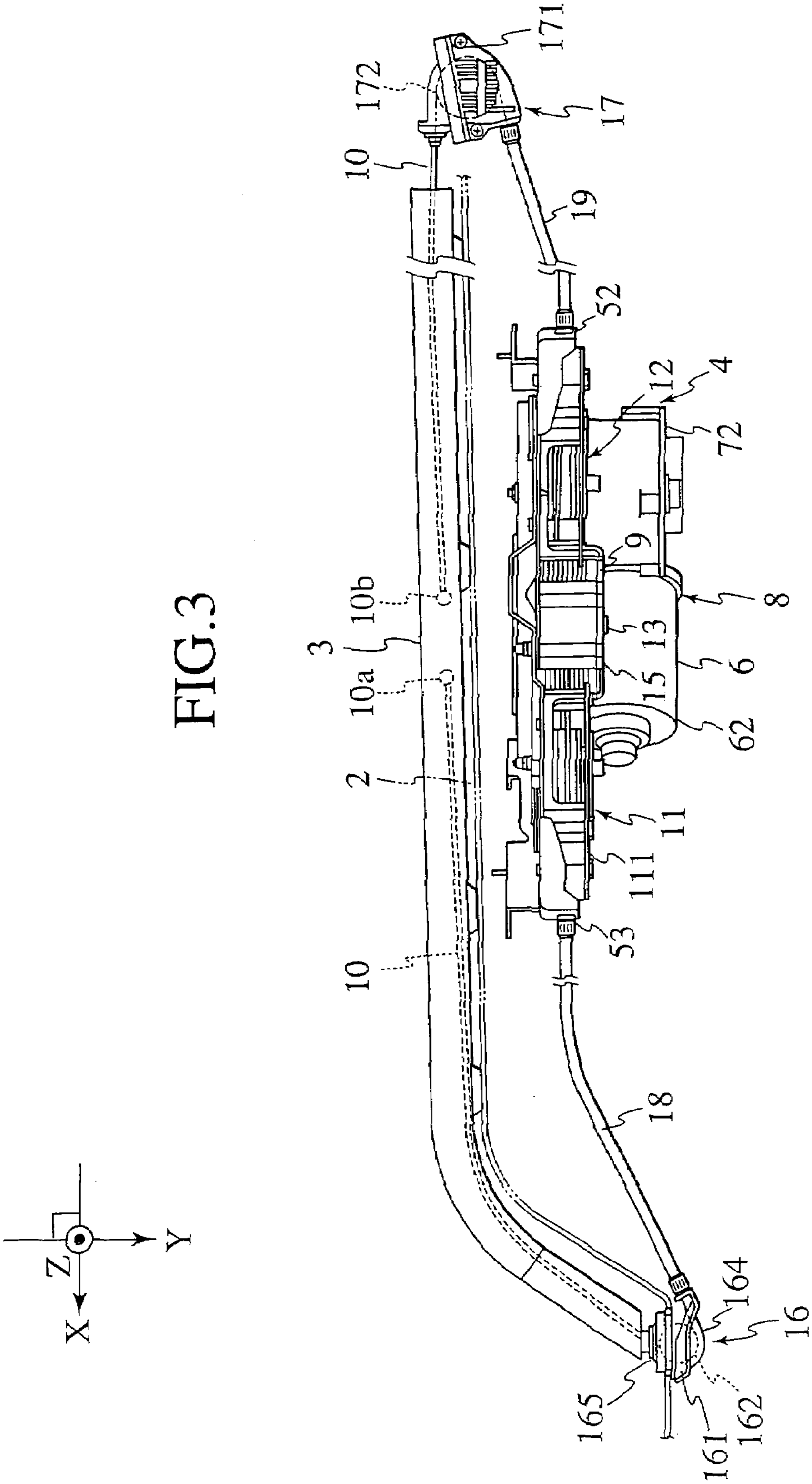
FIG. 3 is a plane view of the opening-and-closing device for vehicle according to the present invention.

As shown in FIG. 3, the cable 10 fed from the rotary drum 9 toward in the front of the vehicle is paid out from the front end (+X side) of the first conduit 18, guided by the first cable guide member 16, and wired on the external side plate of the body panel 2. And then, the cable 10 extends toward in the rear (−X side) of the vehicle from the front end (+X side) of the guide rail 3. The cable end 10*a* is fixed to the front end portion (+X side) of the cable 10 and connected to a guide roller (not shown) of the sliding door 1. The guide roller is slidably engaged with the guide rail 3.

The cable 10 fed from the rotary drum 9 toward in the rear of the vehicle is paid out from the rear end (−X side) of the second conduit 19, guided by the second cable guide member 17, and wired on the external side plate of the body panel 2. And then, the cable 10 extends toward in the front (+X side) of the vehicle from the rear end (−X side) of the guide rail 3. A cable end 10*b* is fixed to the rear end portion (−X side) of the cable 10 and connected to the guide roller of the sliding door 1. The guide roller is slidably engaged with the guide rail 3.

Figure 11:
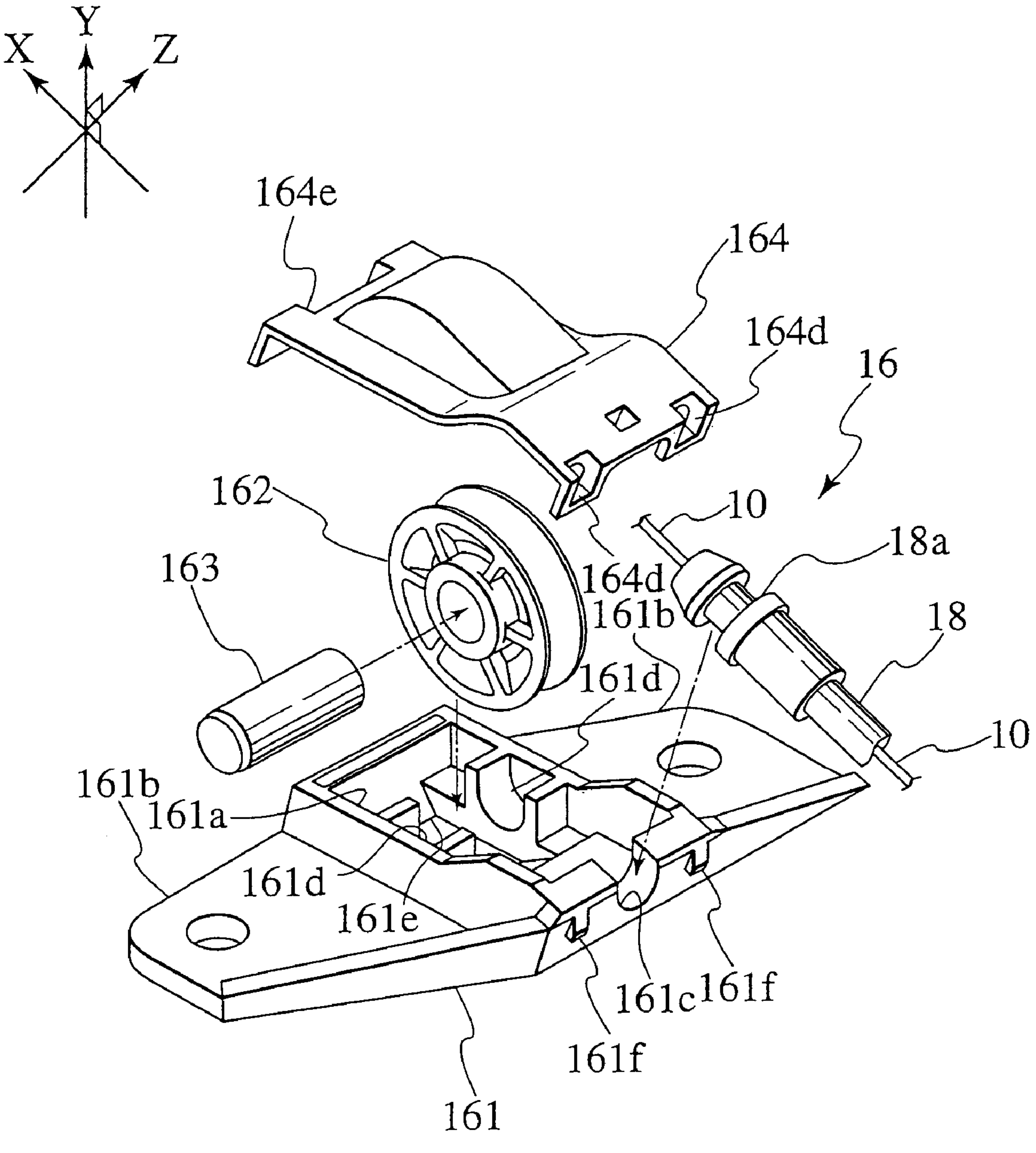
FIG. 11 is an exploded perspective view of a first cable guide member according to the present invention.
Figure 12:
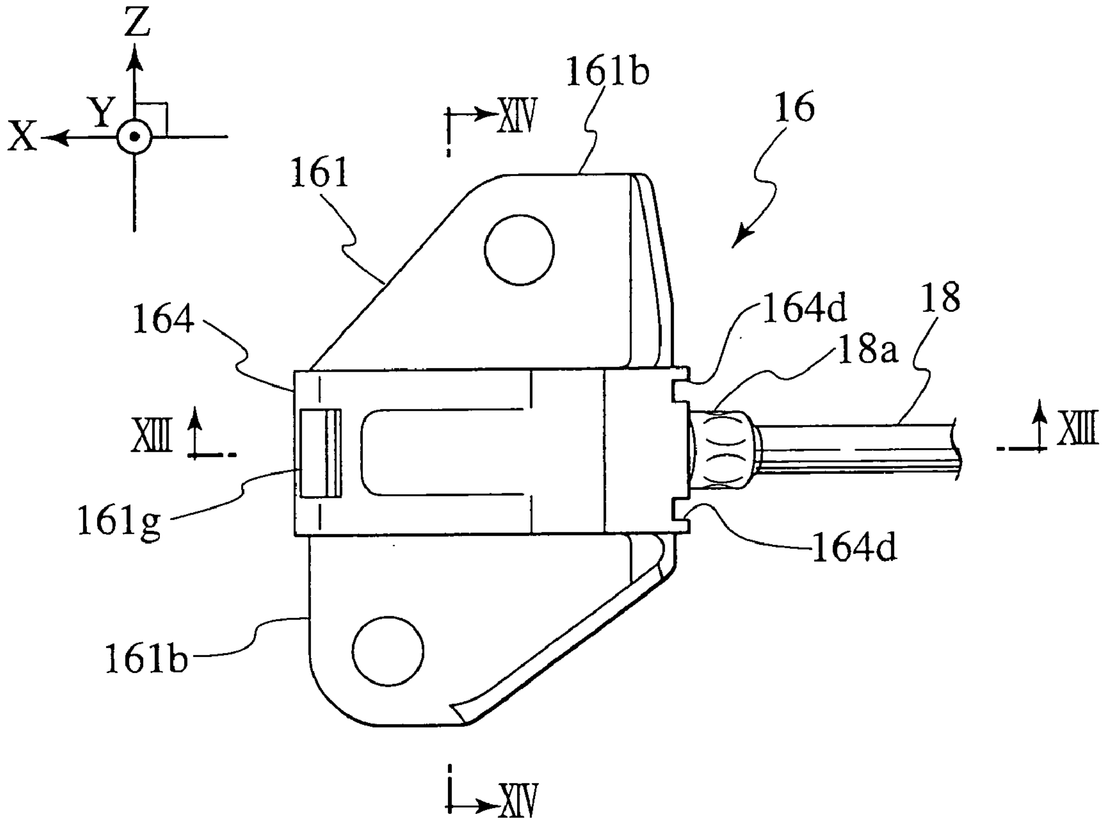
FIG. 12 is a front view of the first cable guide member according to the present invention.
Figure 13:
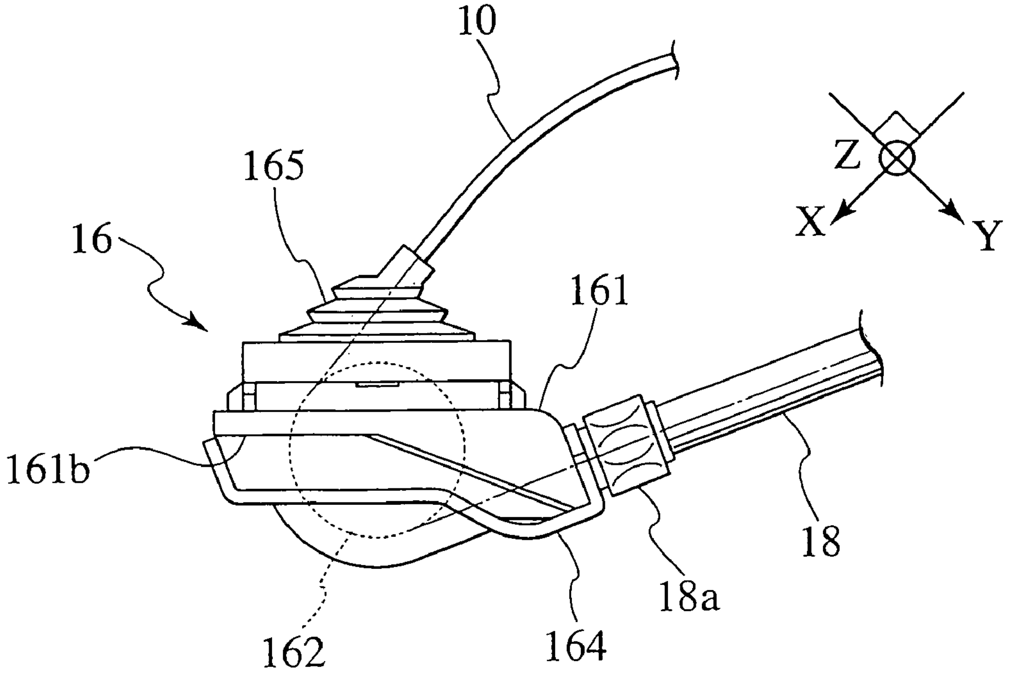
FIG. 13 is a plane view of the first cable guide member according to the present invention.
Figure 14:
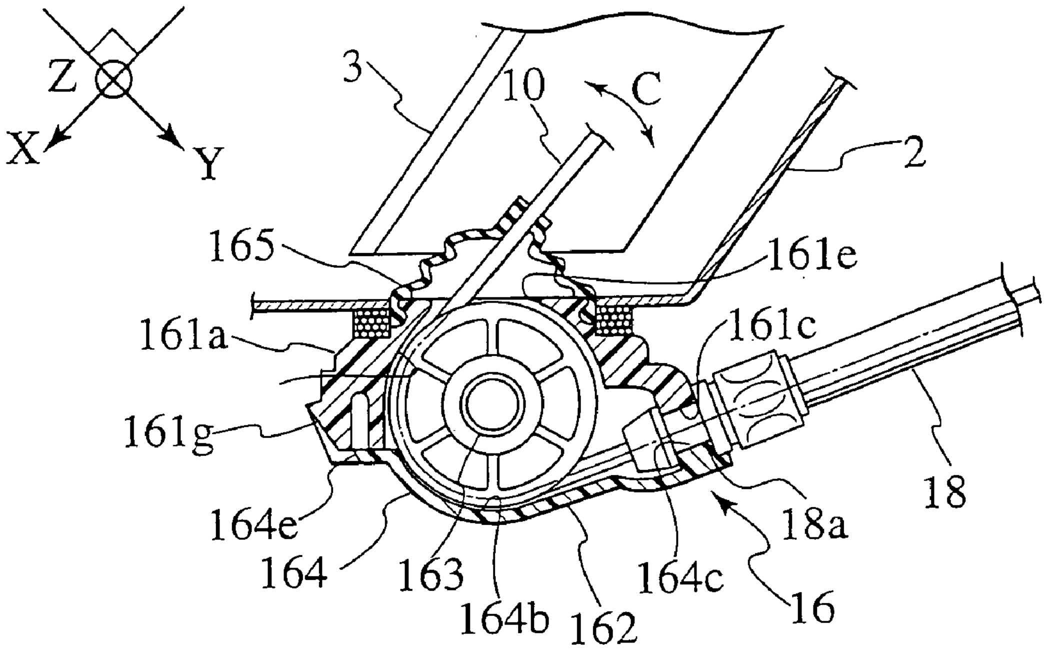
FIG. 14 is a cross-sectional view along the XIII-XIII line in FIG. 12.

The first cable guide member 16 is disposed on the interior side plate (+Y side) of the body panel 2, which is positioned near a front end (+X side) of the guide rail 3. As shown in FIG. 11, the first cable guide member 16 has a casing 161, a pulley 162, a shaft 163, a cover 164 and a boot 165 (the boot 165 is not shown in FIG. 11). The casing 161 is made of a hard synthetic resin and fixed to the body panel 2 with bolts (not shown). The casing 161 has a central portion where a container portion 161*a* is formed so as to be concave toward the exterior (−Y side) of the vehicle. The pulley 162 guides the cable 10, which has been paid out of the front end of the first conduit 18, from the internal side plate to the external side plate of the body panel 2. The shaft 163 extends along the vertical direction (Z-axis) of the vehicle. The pulley 162 is rotatably supported with the shaft 163. The cover 164 is made of a synthetic resin and fixed to the casing 161. The cover 164 closes an opening of the container portion 161*a* so as to cover the pulley 162. As shown in FIG. 13 and 14, the boot 165 is made of an elastic material such as rubber and is attached to the bottom portion (−Y side) of the casing 161 and projects toward the guide rail 3.

When the pulley 162 is assembled into the casing 161, the pulley 162 is supported with the shaft 163 in the container portion 161*a* under the situation of removing the cover 164. Then, most of an external peripheral face of the pulley 162 is exposed out of the container portion 161*a* and abuts on the cable 10. Consequently, during operations for putting the cable 10 on the pulley 162, it is possible to confirm visually whether the cable securely abuts on the external peripheral face of the pulley 162.

The casing 161 has both end portions on which attaching segments 161*b*, 161*b* are formed. The attaching segments 161*b*, 161*b* are fixed on the body panel 2 with bolts. Also, the casing 161 has a central portion side (−X side) in which a conduit fit groove 161*c* is formed. A front end portion 18*a* of the first conduit 18 is fitted into the conduit fit groove 161*c*. Further, the casing 161 has shaft fit grooves 161*d*, 161*d* with which both end portions of the shaft 163 is supported in the container portion 161*a*. The shaft fit grooves 161*d*, 161*d* are substantially U-shaped in the cross section.

The first cable guide member 16 is fixed to the body panel 2 by fitting the bottom portion of the casing 161 into a through hole (not shown) of the body panel 2. In the bottom portion of the casing 161 formed is a cable insertion hole 161*e* for guiding the cable 10 from the internal side plate to the external side plate of the body panel 2. A pair of claw portions 161*f*, 161*f* are formed at the rear end (−X side) of the casing 161. A claw portion 161*g* is formed at the front end (+X side) of the casing 161.

The cable insertion hole 161*e* is closed with the boot 165. The cable 10 is slidably passed through the boot 165. As shown in FIG. 14, the boot 165 flexibly deforms following the movement of the cable 10 in the direction of the arrow C due to the movement of the sliding door 1. Thereby, percolation of rainwater through the cable insertion hole 161*e* into the casing 161 can be surely prevented and the moving direction of the cable 10 can be changed smoothly.

Figure 15:
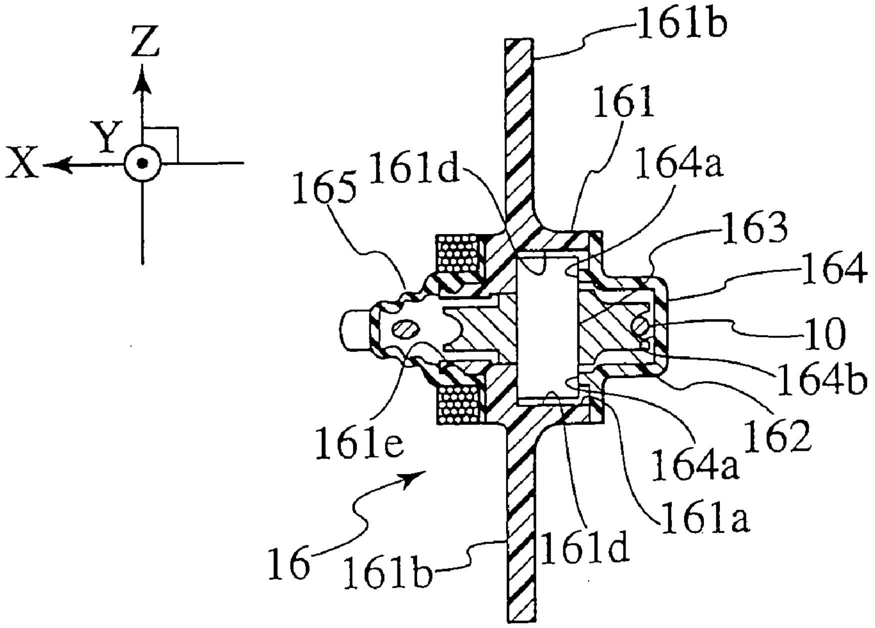
FIG. 15 is a cross-sectional view along the XIV-XIV line in FIG. 12.

As shown in FIG. 14 and 15, the cover 164 has a shaft hold portion 164*a*, an inner wall portion 164*b*, a conduit hold portion 164*c*, coupling holes 164*d*, 164*d* and a coupling hole 164*e*. The shaft hold portion 164*a* is formed on the inner surface of the cover 164 and is opposed to both end portions of the shaft 163 fitted into the shaft fit groove 161*d*. The inner wall portion 164*b* is formed in the shape of an arc and is opposed to the external peripheral face of the pulley 162. The conduit hold portion 164*c* is coupled with the front end portion 18*a* of the first conduit 18, which has been fitted into the conduit fit groove 161*c*, in order to press the front end portion 18*a* on the conduit fit groove 161*c*. The coupling holes 164*d*, 164*d* are formed at the rear end portion (−X side) of the cover 164. The coupling hole 164*e* is formed at the front end portion (+X side) of the cover 164. The cover 164 covers up the pulley 162 and also closes an opening of the container portion 161*a* by fixing the cover 164 to the casing 161 through engaging the claw portions 161*f*, 161*f* with the coupling holes 164*d*, 164*d* and through engaging the coupling hole 164*e* with the claw portion 161*g*. Additionally, the claw portions may be provided for the cover 164 and the coupling holes may be provided for the casing 161.

As shown in FIG. 3, the second cable guide member 17 is disposed on the internal side plate (+Y side) of the body panel 2, which is positioned near a rear end (−X side) of the guide rail 3. The second cable guide member 17 has a casing 171 to be fixed to the body panel 2 with bolts (not shown) and a pulley 172 to be rotatably received in the casing 171. Most of the external peripheral face of the pulley 172 abuts the cable 10. Since the structure of the second cable guide member 17 is almost the same as that of the first cable guide member 16, the detailed description will be omitted. Further, the structure of the second cable guide member 17 may be entirely the same as that of the first cable guide member 16.

Next, movements of the opening-and-closing device 4 will be described below. When a control switch is thrown in, the output shaft 61 of the motor 6 rotates to excite the electromagnetic clutch 75. Thereby, the output gear 71 is attracted onto the attracted face 74*a* of the idle gear 74. Therefore, number of the revolutions of the motor 6 is transmitted sequentially to the worm gear 61*a*, the worm wheel 73, the idle gear 74, the output gear 71, the gear portion 93, and is outputted to the rotary drum 9, and then the rotary drum 9 is rotated in the given direction.

Additionally, when the rotary drum 9 rotates in a counterclockwise direction, the cable 10 on the −X side is wound on the drum portion 91 of the rotary drum 9 and at the same time the cable 10 on the +X side is fed from the drum portion 91. The guide roller of the sliding door 1 is moved along the guide rail 3 toward in the rear (−X direction) of the vehicle, corresponding to the movement of the cable 10. Therefore, the sliding door 1 will be opened. On the other hand, when the rotary drum 9 rotates in a clockwise direction, the cable 10 on the +X side is wound on the drum portion 91 of the rotary drum 9 and at the same time the cable 10 on the −X side is fed from the drum portion 91. The guide roller of the sliding door 1 is moved along the guide rail 3 toward in the front (+X direction) of the vehicle, corresponding to the movement of the cable 10. Therefore, the sliding door 1 will be closed.

When the rotary drum 9 rotates in the counterclockwise direction, the slack of the cable on the +X side fed from the drum portion 91 of the rotary drum 9 occurs, but the slack will be taken up by means of the first tension controller 11. Further, when the rotary drum 9 rotates in the clockwise direction, the slack of the cable on the −X side fed from the drum portion 91 of the rotary drum 9 occurs, but the slack will be taken up by means of the second tension controller 12. Therefore, the opening-and-closing device 4 can quickly open and close the sliding door 1.

Although the cable 10 is employed in the opening-and-closing device for opening-and-closing the sliding door 1 in the present embodiment, without limiting that, two cables can be employed in the opening-and-closing device. A modified form of this embodiment will be described below.

Figure 16A:
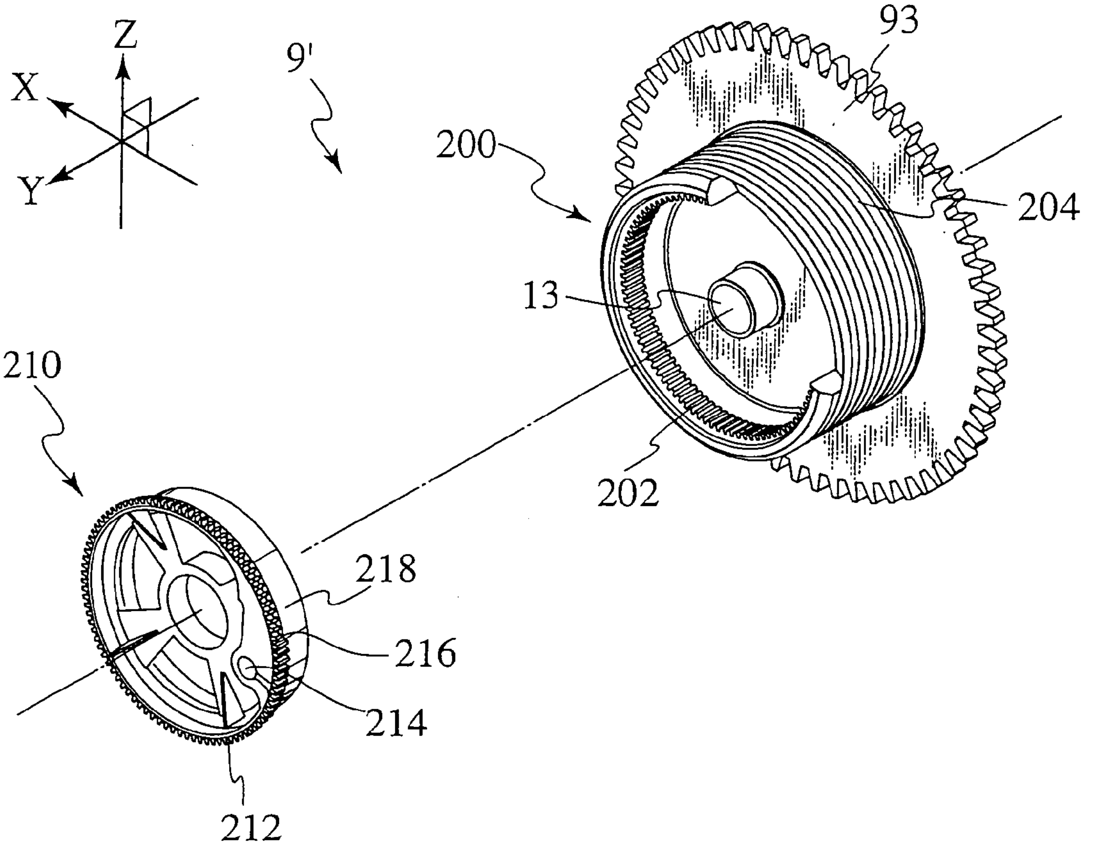
FIG. 16A is an exploded perspective view of a modified rotary drum according to the present invention.
Figure 16B:
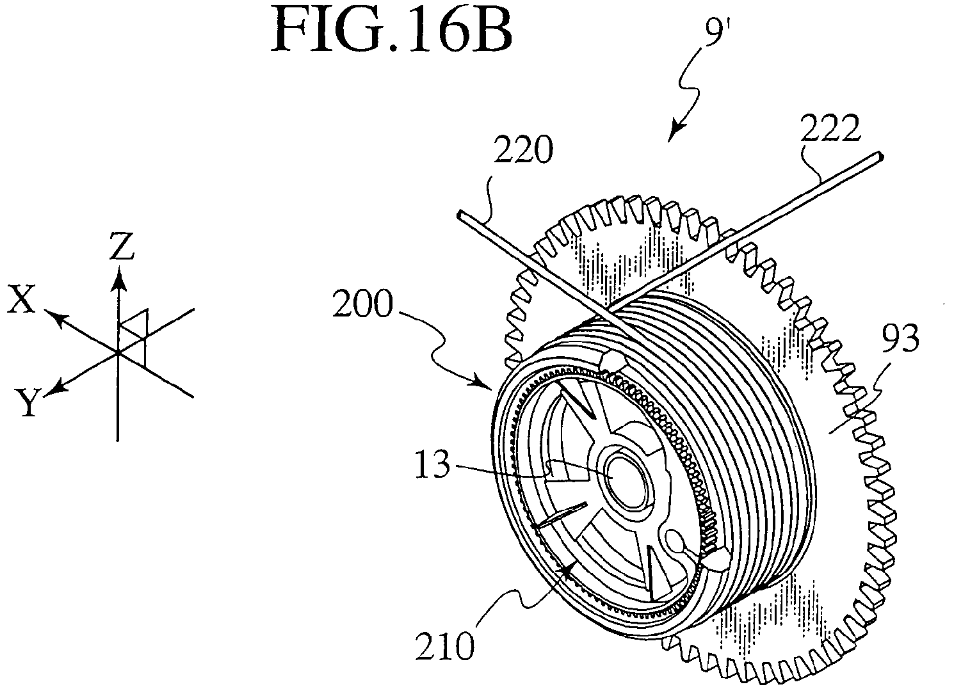
FIG. 16B is a perspective view of the modified rotary drum according to the present invention.

As shown in FIGS. 16A and 16B, a cable assembly is wound around a rotary drum 9'. A first cable 220 has a first end portion connected to the sliding door 1 via the cable end 10*a* and a second end portion wound around the rotary drum 9' in a counterclockwise direction. A second cable 222 has a first end portion connected to the sliding door 1 via the cable end 10*b* and a second end portion wound around the rotary drum 9' in a clockwise direction. The rotary drum 9' has a main drum 200 of which an inner gear 202 is formed on an inner surface and an adjustment drum 210 of which an external gear 212 is formed on an outer surface. The adjustment drum 210 is fixed within the main drum 200 by engaging the external gear 212 with an internal gear 202. An engaging groove (not shown) and a spiral winding groove 204 are formed on the outer surface of the main drum 200. An engaging groove 214 is formed on the outer surface of the adjustment drum 210.

Under this structure, the second end portion of the second cable 222 is engaged with the engaging groove and wound around the winding groove 204 on the −Y side of the main drum 200. The second end portion of the first cable 220 is engaged with the engaging groove 214 and wound around the winding groove 204 via a cutting portion 216 and a guiding portion 218 of the adjustment drum 210 on the +Y side of the main drum 200.

The first cable 220 fed from the rotary drum 9' toward the front of the vehicle is paid out from the first conduit 18, guided by the first cable guide member 16, and wired on the external side plate of the body panel 2. Also, the second cable 222 fed from the rotary drum 9' toward the rear of the vehicle is paid out from the second conduit 19, guided by the second cable guide member 17, and wired on the external side plate of the body panel 2.

In the case where the cable assembly is longer than the path through which the cable is wired at the time of the attaching operation, since the second end portions of the first cable 220 and the second cable 222 are respectively connected to the adjustment drum 210 and the main drum 200, the cable assembly can be fine-adjusted in the total length thereof

What is claimed is:

1. A tension controller for applying tension to a cable connected to an opened-and-closed body which is movably attached to a vehicle body, comprising;

an abutting member moving between a first area where the cable is abutted thereon and a second area where the cable is not abutted thereon;

a spring biasing the abutting member in such a direction as to apply tension to the cable in the first area; and an engagement portion holding the abutting member against the biasing force of the spring in the second area.

2. The tension controller according to claim 1, further comprising:

a guide portion extending in a direction intersecting with the moving direction of the cable in the first area and guiding the abutting member along the direction.

3. The tension controller according to claim 2, wherein the engagement portion extends from the guide portion along the moving direction of the cable.

4. The tension controller according to claim 3, wherein the abutting member has:

an arm fitted into the guide portion slidably and rotatably; and a pulley attached to the arm with a shaft and moving between the first area and the second area.

5. The tension controller according to claim 4, wherein the arm is substantially U-shaped and has a guide projection at a free end thereof.

6. The tension controller according to claim 5, wherein the abutting member is movably fitted in the first area by coupling the guide projection of the arm with the guide portion.

7. The tension controller according to claim 5, wherein the abutting member is temporarily held in the second area by coupling the guide projection of the arm with the engagement portion.

8. The tension controller according to claim 5, wherein the spring has an end portion engaged with a basal end portion of the arm.

9. The tension controller according to claim 4, further comprising:

a cable guide portion disposed in the vicinity of the abutting member and slidably contacting the cable along the moving direction of the cable.

10. The tension controller according to claim 9, wherein a slide contact surface of the cable guide portion is gently curved toward the cable.

11. The tension controller according to claim 10, further comprising:

a casing fixed to the vehicle body and receiving the abutting member, the spring, the engagement portion, the guide portion and the cable guide portion; and a cover member covering an opening of the casing.

12. The tension controller according to claim 9, wherein the engagement portion has an engagement groove portion formed on the casing and an engagement hole portion formed on the cover member so as to be opposed to the engagement groove portion, and the guide portion has a guide groove portion formed on the casing so as to communicate with the engagement groove portion and a guide hole portion formed on the cover member so as to be opposed to the guide groove portion, and the cable guide portion is formed into one through hole portion for passing the cable within the casing.

13. An opening-and-closing device for vehicle for opening and closing an opened-and-closed body by using a cable connected to the opened-and-closed body which is movably attached to a vehicle body, comprising:

a base bracket fixed to the vehicle body with bolts;

a motor fixed to a disposition face of the base bracket;

a transmission fixed to the disposition face of the base bracket and changing number of the revolutions of the motor;

a rotary drum supported with a shaft in the central portion of the disposition face of the base bracket, and winding one part of the cable thereon and feeding another part of the cable therefrom at the same time by the rotation of the motor outputted from the transmission;

a first conduit fixed portion fixed to a first end portion of the disposition face of the base bracket and slideably passing the cable therethrough;

a second conduit fixed portion fixed to a second end portion of the disposition face of the base bracket and slidably passing the cable therethrough;

a first tension controller fitted between the rotary drum and the first conduit fixed portion and applying tension to the cable fed from the rotary drum, based on the rotation in a first direction of the rotary drum; and a second tension controller fitted between the rotary drum and the second conduit fixed portion and applying tension to the cable fed from the rotary drum, based on the rotation in a second direction of the rotary drum;

wherein the base bracket has a first recess for receiving a part of the rotary drum therein and a second recess extending along with the moving direction of the cable in the region thereof opposed to at least one of the first tension controller and the second tension controller.

14. The opening-and-closing device for vehicles according to claim 13, wherein one side surface of a casing of the motor is opposed to an external peripheral face of the rotary drum in a short distance, and an output shaft of the motor extends in the direction substantially perpendicular to the shaft of the rotary drum.

15. The opening-and-closing device for vehicles according to claim 13, wherein the first recess has a reinforcement beam therein, the reinforcement beam being cross shaped in the cross section.

16. The opening-and-closing device for vehicles according to claim 15, wherein the reinforcement beam has a shaft hole into which the shaft of the rotary drum is rotatably fitted in the central portion thereof.

* * * * *